United States Patent
Lee et al.

(10) Patent No.: US 8,683,345 B2
(45) Date of Patent: Mar. 25, 2014

(54) METHOD AND APPARATUS FOR DISPLAYING A CONTROL LOCKING FUNCTION

(75) Inventors: Min Soo Lee, Seoul (KR); Beom Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 12/839,730

(22) Filed: Jul. 20, 2010

(65) Prior Publication Data

US 2011/0126116 A1 May 26, 2011

(30) Foreign Application Priority Data

Nov. 23, 2009 (KR) .................. 10-2009-0113104

(51) Int. Cl.
*G06F 3/00* (2006.01)
(52) U.S. Cl.
USPC ............................ 715/739; 715/835; 715/741
(58) Field of Classification Search
None
See application file for complete search history.

(56) References Cited

U.S. PATENT DOCUMENTS

| | | | |
|---|---|---|---|
| 6,198,479 B1 * | 3/2001 | Humpleman et al. | 715/733 |
| 2004/0028375 A1 * | 2/2004 | Kim et al. | 386/46 |
| 2005/0021513 A1 | 1/2005 | Vedula et al. | 707/3 |
| 2005/0097478 A1 * | 5/2005 | Killian et al. | 715/851 |
| 2005/0246409 A1 | 11/2005 | Weber | 709/200 |
| 2006/0235979 A1 | 10/2006 | Bizet et al. | 709/227 |
| 2006/0236349 A1 * | 10/2006 | Lee | 725/80 |
| 2007/0079340 A1 * | 4/2007 | McEnroe | 725/78 |
| 2007/0162618 A1 | 7/2007 | Weber | 709/250 |
| 2007/0290876 A1 * | 12/2007 | Sato et al. | 340/825.22 |
| 2009/0106444 A1 * | 4/2009 | Agnihotri et al. | 709/233 |

FOREIGN PATENT DOCUMENTS

| | | |
|---|---|---|
| EP | 1 793 592 A2 | 6/2007 |
| WO | WO 00/62176 A1 | 10/2000 |
| WO | WO 2007/101218 A2 | 9/2007 |

OTHER PUBLICATIONS

PCT International Search Report dated Mar. 1, 2011 issued in Application No. PCT/KR2010/003876.
European Search Report for Application 10831708.2 dated Oct. 2, 2013.

* cited by examiner

*Primary Examiner* — Stephen Hong
*Assistant Examiner* — Asher Kells
(74) *Attorney, Agent, or Firm* — KED & Associates LLP

(57) ABSTRACT

An apparatus for controlling a multimedia device and a method for providing a graphic user interface are disclosed. In the apparatus, a network interface transmits and receives data to and from the at least one multimedia device. A display displays a screen. A controller controls to display at least one place selection menu indicating a place in which the at least one multimedia device is located on the screen, display, upon selection of the at least one place selection menu, at least one player selection menu indicating a player located in the place, on the screen, and display at least one source selection menu indicating a source capable of outputting contents to the player on the screen, upon selection of the at least one player selection menu.

8 Claims, 10 Drawing Sheets

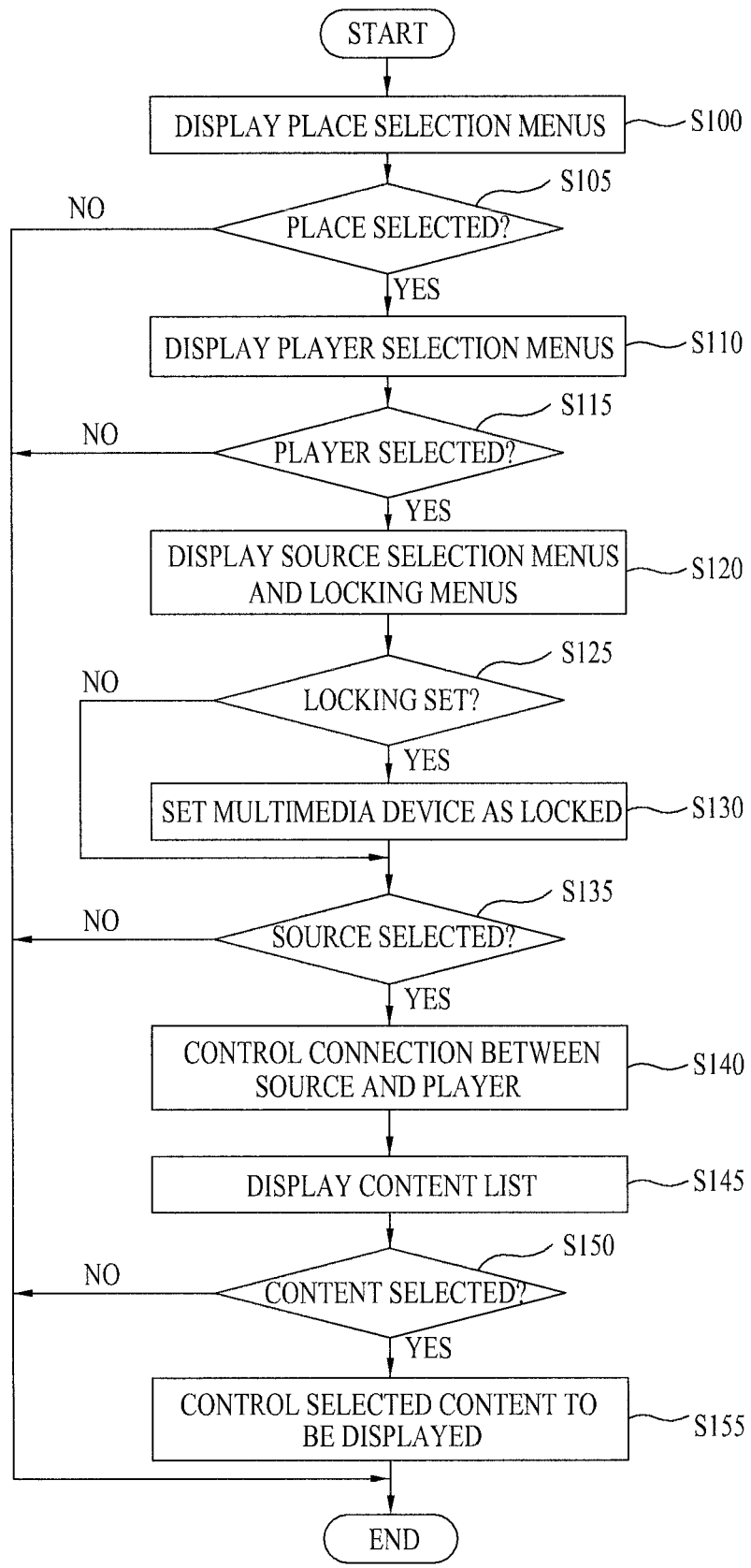

METHOD AND APPARATUS FOR DISPLAYING A CONTROL LOCKING FUNCTION

This application claims the benefit of Korean Patent Application No. 10-2009-0113104, filed on Nov. 23, 2009 which is hereby incorporated by reference as if fully set forth herein.

BACKGROUND OF THE INVENTION

1. Field of the Invention

The present invention relates to an apparatus for controlling a multimedia device and a method for providing a Graphic User Interface (GUI).

2. Discussion of the Related Art

Home networks that place "home" at the core of the market have recently attracted much attention. Home networking refers to a technology that connects all communication devices and electronic appliances within a household and controls them, indoors and outdoors. A variety of devices may be connected for home networking, including living appliances such as a refrigerator, a washer, a door lock, an air conditioner, and a heater as well as audio, video and information appliances such as a TV, a PC, an audio, a telephone, a facsimile, and a printer.

The communication sector that is responsible for building networks is promoting home networks as a new business to overcome the saturation of the ultra high-speed Internet market. The home appliance industry is also pushing ahead with a paradigm shift from the traditional white home appliances to digital information appliances and digital convergence devices. Meanwhile, the Information Technology (IT) venture industry is preparing for a home network business in a wide range of fields including voice recognition, robotics, embedded software, and digital contents.

Especially, a large number of users have a plurality of PCs in their homes, network gaming is very popular, and almost all households have subscribed to ultra high-speed communication services. As a matter of fact, the infrastructure of the home network industry has already been put in place. The traditional communication environment in which PCs or specific equipment are connected to the Internet has been rapidly giving place to an Internet environment in which all devices are interconnected. Above all things, more and more users want to connect to their desired services while they are moving, owing to the development of mobile communication technology.

Along with this trend, the home environment has also been changed greatly. Beyond their unique functions, home appliances have been developed to be interconnected by networking and share desired information among them. Also, various home networking technologies are under development to connect home appliances with one another, such as a TV, an audio, etc.

Basically, a home network system that provides Internet connectivity to a user includes an Internet Protocol (IP) set-top box. The IP set-top box is a device that provides an information services, video contents, and broadcast programs to an image device such as a TV over an IP network, namely an ultra high-speed Internet. The home network system plays external media contents received from the Internet through the IP set-top box.

The recent development of electronics and mass production of electronic devices are a driving force behind the continuous decrease of the prices of electronic products, particularly portable multimedia devices. For example, products such as Portable Multimedia Players (PMPs), Personal Digital Assistants (PDAs), and mobile phones are cheap relative to their large capacities and various functions.

Mobile phones that have recently been put to the market offer multimedia functions like an MP3 player, a camera, an electronic dictionary to users, in addition to their basic function, that is, call. Although relatively expensive compared to other portable multimedia devices, a PMP is attracting interest as a promising future-generation portable convergence device that will substitute for an MP3 player due to its advantages of functionality and convenience.

To allow a user to view a video or an MP3 file with such an image device and a PMP, files stored in a PC or a home server (e.g. a home network server or a home gateway) should be received by a menu available at the image device and the PMP. To do so, however, the user should inconveniently connect the PC to the image device and the PMP by a Universal Serial Bus (USB).

SUMMARY OF THE INVENTION

An object of the present invention devised to solve the problem lies on an apparatus for controlling a multimedia device and a method for providing a Graphic User Interface (GUI), which enable easy and fast search of a plurality of multimedia devices connected to a local network.

Another object of the present invention devised to solve the problem lies on an apparatus for controlling a multimedia device and a method for providing a GUI, which easily control a plurality of multimedia devices connected to a local network.

A further object of the present invention devised to solve the problem lies on an apparatus for controlling a multimedia device and a method for providing a GUI, which easily control interconnections among a plurality of multimedia devices connected to a local network.

The object of the present invention can be achieved by providing a method for providing a graphic user interface to control at least one multimedia device connected to a local network, including displaying at least one place selection menu indicating a place in which the at least one multimedia device is located, displaying, upon selection of the at least one place selection menu, at least one player selection menu indicating a player located in the place, displaying at least one source selection menu indicating a source capable of outputting contents to the player, upon selection of the at least one player selection menu, and controlling connection between the source and the player, upon selection of the at least one source selection menu.

For displaying the at least one source selection menu, a locking menu for setting a locking function for at least one of the player and the source may be displayed. The locking function may include at least one of a control locking function for disabling the at least one of the player and the source from being controlled, a view locking function for disabling the at least one of the player and the source from being viewed, and a sound locking function for disabling the at least one of the player and the source from outputting sound.

A player selection menu indicating a locked player may be displayed as unavailable for selection.

A locking menu associated with a locked source may be displayed as unavailable for selection.

The method may further include displaying a list of contents available from the source. The content list may be received by a Digital Living Network Alliance (DLNA) protocol.

The source and the player may be controlled by Consumer Electronics Control (CEC).

In another aspect of the present invention, provided herein is an apparatus for controlling at least one multimedia device connected to a local network, including a network interface configured to transmit and receive data to and from the at least one multimedia device, a display configured to display a screen, and a controller configured to control displaying at least one place selection menu indicating a place in which the at least one multimedia device is located, on the screen, displaying, upon selection of the at least one place selection menu, at least one player selection menu indicating a player located in the place, on the screen, displaying at least one source selection menu indicating a source capable of outputting contents to the player on the screen, upon selection of the at least one player selection menu, and connection between the source and the player, upon selection of the at least one source selection menu.

The controller may control a locking menu for setting a locking function for at least one of the player and the source to be displayed on the screen.

The display may display a player selection menu indicating a locked player as unavailable for selection.

The display may display a locking menu associated with a locked source as unavailable for selection.

The controller may control a list of contents available from the source to be displayed on the screen. The controller may control the content list to be received by a DLNA protocol.

The controller may control the source and the player by CEC.

In a further aspect of the present invention, provided herein is a method for providing a graphic user interface to control at least one multimedia device connected to a local network, including displaying at least one place selection menu indicating a place in which the at least one multimedia device is located, displaying, upon selection of the at least one place selection menu, at least one multimedia device selection menu indicating a multimedia device available in the place, and displaying a list of contents available from the multimedia device, upon selection of the at least one multimedia device selection menu.

For displaying the at least one multimedia device selection menu, a locking menu for setting a locking function for the multimedia device may be displayed.

The locking function may include at least one of a control locking function for disabling the multimedia device from being controlled, a view locking function for disabling the multimedia device from being viewed, and a sound locking function for disabling the multimedia device from outputting sound.

A multimedia device selection menu indicating a locked multimedia device may be displayed as unavailable for selection.

The content list may be received by a DLNA protocol.

According to the apparatus for controlling a multimedia device and the method for providing a GUI according to the present invention, once a place in which a multimedia device to be connected is located and a multimedia player are selected, currently available multimedia sources and contents available from the multimedia sources can be provided at the same time. Therefore, a user can search for a multimedia device more easily and more rapidly.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 10 is a flowchart illustrating a method for providing a GUI according to an embodiment of the present invention.

DETAILED DESCRIPTION OF THE INVENTION

Reference will now be made in detail to the preferred embodiments of the present invention with reference to the accompanying drawings. The configuration and operation of the present invention, which are illustrated in and described by the accompanying drawings, are described as at least one embodiment. However, it will be apparent to those skilled in the art that the technical spirit and essential configuration and operation of the present invention are not limited to the specific embodiment as set forth herein.

Although most terms used in the present invention have been selected from general ones widely used in the art, some terms have been arbitrarily selected by the applicant and their meanings are explained in detail in the following description as needed. Thus, the present invention should be understood with the intended meanings of the terms rather than their simple names or meanings.

Figure 1:
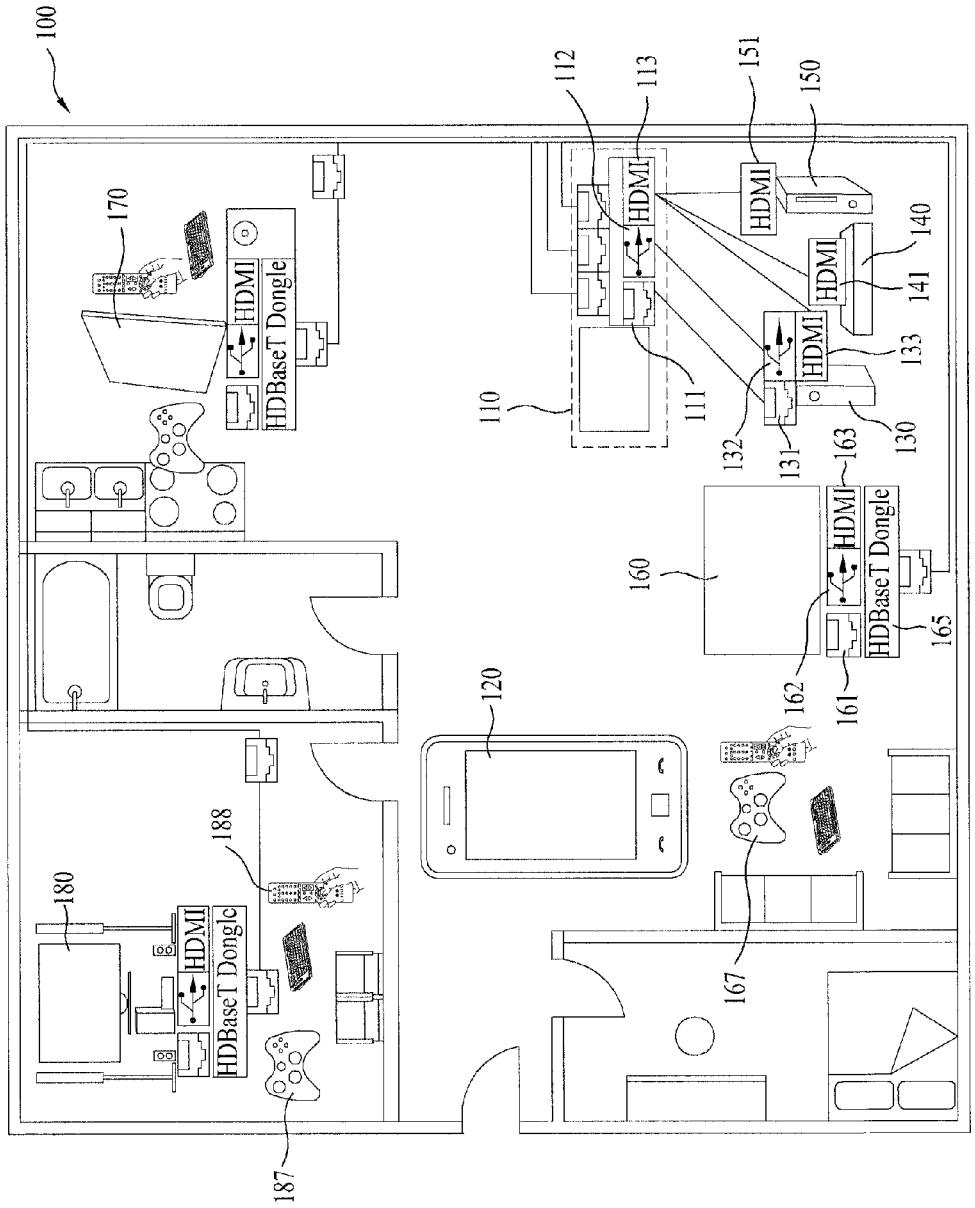
FIG. 1 illustrates the configuration of a multimedia system according to an embodiment of the present invention.

FIG. 1 illustrates the configuration of a multimedia system according to an embodiment of the present invention.

Referring to FIG. 1, a multimedia system 100 according to the present invention includes sources, players, network devices, and a multimedia device controlling apparatus. The sources are multimedia devices capable of outputting contents to players. Therefore, the sources include a recording medium player for reading contents from a recording medium, and a set-top box and a TV for receiving a broadcast service. For example, the sources may be a PC 130, a Blu-ray Disc Player (BDP) 140, and a game player 150.

The players are multimedia devices which play back contents received from the sources, that is, which output contents visually and audibly. For instance, the players may be a High Definition TV (HDTV) 160, a monitor 170, and a Home Theater System (HTS) 180.

A single multimedia device may function as at once a source and a player. For instance, a broadcasting receiver may act as a source in the sense that it provides recorded broadcast contents to a player and as a player in the sense that it plays back contents received from a source.

The network device manages data flows and data transfers within a local network and provides physical network connection interfaces to multimedia devices. For example, the network device may be an HDBaseTSwitch 110 that supports the HDBaseT technology. The HDBaseTSwitch 110 may deliver contents from a source to a player without delay by the HDBaseT technology. Specifically, the HDBaseTSwitch 110 may receive uncompressed video contents and game contents from a remote source via a Local Area Network (LAN) cable and play back the received video contents and game contents without delay. Therefore, users may enjoy a game together using their game controllers 167 and 187 at different places without delay and view the same video through their players 170 and 180.

The network device may provide a LAN connector 111, a USB port 112, and a High Definition Multimedia Interface (HDMI) port 133 as physical network connection interfaces.

The PC 130 may be connected to the HDBaseTSwitch 110 via at least one of a LAN connector 131, a USB port 132 and an HDMI port 133. The BDP 140 may be connected to the HDBaseTSwitch 110 via an HDMI port 141 and the game player 150 may be connected to the HDBaseTSwitch 110 via an HDMI port 151.

The multimedia system 100 may provide an HDBaseT dongle 165 for a multimedia device remote from the network device.

The HDTV 160 is connected to the HDBaseT dongle 165 via at least one of a LAN connector 161, a USB port 162, and an HDMI port 163 and thus may receive data from the HDBaseTSwitch 110 through the HDBaseT dongle 165.

The HDBaseTSwitch 110 supports mutual remote control between the multimedia device controlling apparatus and the multimedia devices or between the multimedia devices, by Customer Electronic Control (CEC). For example, a user may control the remote monitor 170 using a remote controller 188. A signal for the mutual remote control may be transmitted as an HDMI output.

The multimedia device controlling apparatus controls the multimedia devices and connections between the sources and the players. For controlling the multimedia devices and connections between the sources and the players, the multimedia device controlling apparatus may provide GUIs. When controlling the multimedia devices, the multimedia device controlling apparatus may reply on CEC.

The multimedia device controlling apparatus may transmit and receive data to and from the HDBaseTSwitch 110, wirelessly or wiredly. For the wireless data transmission and reception, the multimedia device controlling apparatus may comply with a short-range wireless communication technology such as Wireless Fidelity (Wi-Fi), Bluetooth, etc.

For example, the multimedia device controlling apparatus may be a mobile phone 120, a broadcasting receiver, or a PC. The multimedia device controlling apparatus may be configured as a dedicated device to control multimedia devices.

Figure 2:
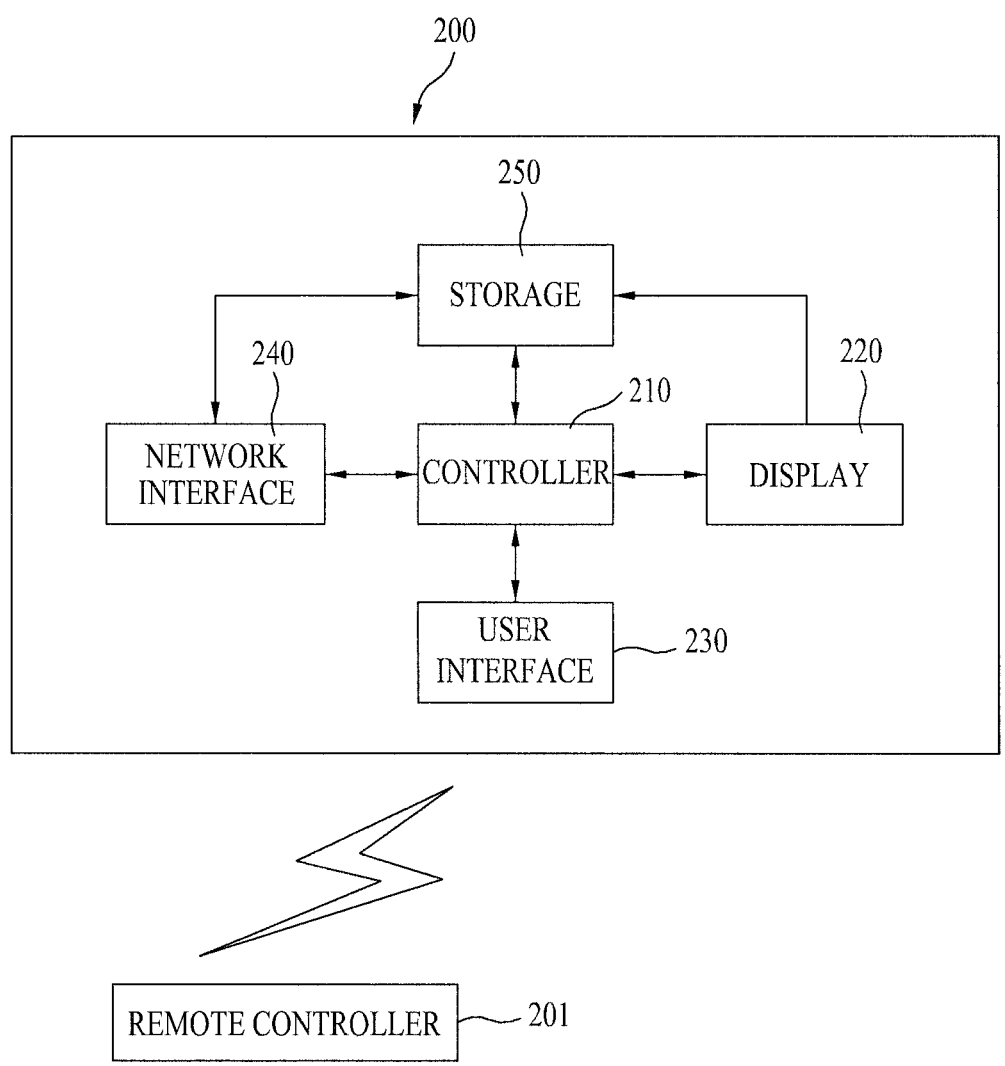
FIG. 2 is a block diagram of an apparatus for controlling a multimedia device according to an embodiment of the present invention.

FIG. 2 is a block diagram of a multimedia device controlling apparatus according to an embodiment of the present invention.

Referring to FIG. 2, a multimedia device controlling apparatus 200 includes a controller 210, a display 220, a user interface 230, a network interface 240, and a storage 250.

The network interface 240 transmits a control signal to a multimedia device via the HDBaseTSwitch 110. Also, the network interface 240 may receive a content list from a source via the HDBaseTSwitch 110. For data transmission and reception from and to the HDBaseTSwitch 110, the network interface 240 may use a short-range wireless communication technology such as Wi-Fi, Bluetooth, etc.

The display 220 displays a GUI on a screen under the control of the controller 210.

The user interface 230 receives a user command from the user. The user may enter a specific user command using a remote controller 201. The user may also enter a command associated with a menu on the GUI displayed on the screen by clicking the menu using the remote controller 201.

The storage 250 may store programs for processing signals and performing control operations by the controller 210, programs and graphics for displaying GUIs on the screen, and setting information about each multimedia device. The storage 250 may also temporarily store data signals received at the user interface 230 and a content list received from a source.

The storage 250 may be configured with at least one type of storage medium among a flash memory type, a hard disk type, a multimedia card micro type, a card-type memory (e.g. an SD or XD memory), a RAM, and a ROM (e.g. EEPROM).

The controller 210 provides overall control to the multimedia device controlling apparatus 200. The controller 210 may receive a signal from the remote controller 201 through the user interface 230, identifies a command entered to the remote controller 201 by the user, and control the multimedia device controlling apparatus 200 according to the command.

The controller 210 also controls multimedia devices connected to a local network. The controller 210 may control the display 220 to display a GUI for controlling a multimedia device. Upon receipt of a multimedia device control request command, the controller 210 controls the display 220 to display at least one place selection menu indicating a place where a multimedia device is located on the screen. When the user selects a place selection menu on the screen, the controller 210 displays at least one player selection menu indicating a player at the place of the multimedia device on the screen.

When the user selects a player selection menu on the screen, the controller 210 controls the display 220 to display at least one source selection menu indicating a source that may output contents to a player indicated by the selected player selection menu. When the user selects a source selection menu on the screen, the controller 210 controls a connection between a source indicated by the selected source selection menu and the player such that the source outputs contents to the player.

The controller 210 may also control the display 220 to display a locking menu for setting a locking function for at least one of players and sources on the screen. When the user sets the locking function for a specific player, the controller 210 controls the display 220 to display a locking menu for the player as unavailable for selection. If the user sets the locking function for a specific source, the controller 210 controls the display 220 to display a locking menu for the source as unavailable for selection.

The controller 210 may control the display 220 to display a content list provided by a source connected to a player on the screen. Notably, the controller 210 may control the content list to be received from the connected source by a Digital Living Network Alliance (DLNA) protocol. When the user selects a particular content from the displayed content list, the controller 210 controls the source and the player to play back the selected content at the player.

An embodiment in which Alice is an initial user of the multimedia system according to the present invention (Embodiment 1) and an embodiment in which Bob uses the multimedia system during Alice's using the multimedia system (Embodiment 2) will be described separately. In the embodiments, Alice and Bob may use the same or different multimedia device controlling apparatuses.

Embodiment 1

Figure 3:
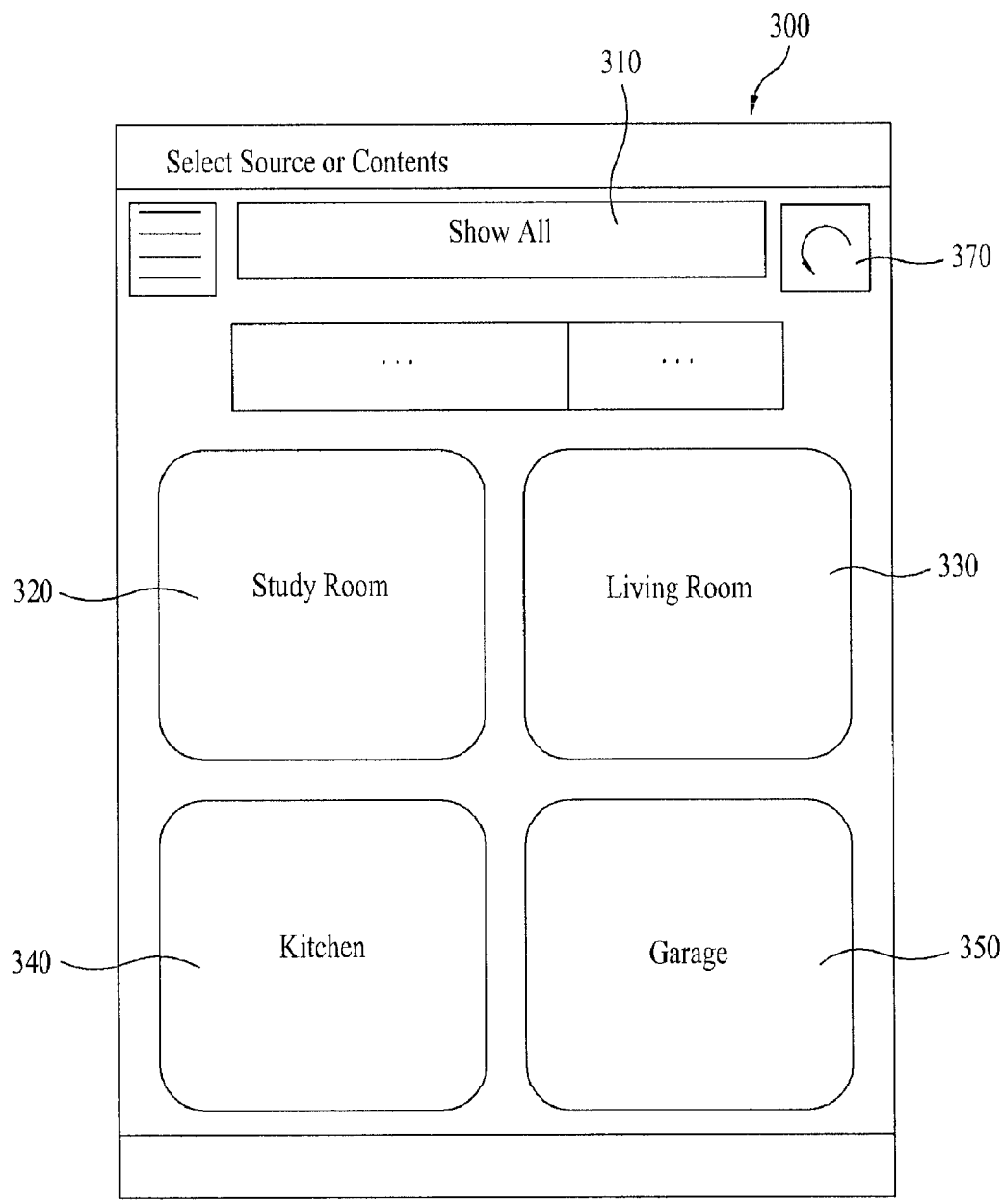
FIG. 3 illustrates a screen that displays a GUI according to an embodiment of the present invention.

FIG. 3 illustrates a screen that displays a GUI according to an embodiment of the present invention.

Referring to FIG. 3, a GUI 300 includes a view selection menu 310, place selection menus 320, 330, 340 and 350, and a previous view menu 370. Upon receipt of a multimedia device control request command, the controller 210 controls the GUI 300 to be displayed on a screen. The multimedia device control request command may be entered by a hot key of the remote controller 201 or by a menu displayed on the screen.

The view selection menu 310 is used to select a particular screen from the screen on which the GUI 300 is displayed. Thus the user may select a particular screen from the screen with the GUI 300 displayed by the view selection menu 310.

The place selection menus 320, 330, 340 and 350 indicate places in which multimedia devices are installed. For example, the place selection menu 320 indicates a study room, the place selection menu 330 indicates a living room, the place selection menu 340 indicates a kitchen, and the place selection menu 350 indicates a garage.

The user may select a place by clicking a place selection menu corresponding to the place. For example, the user may select the study room by clicking the place selection menu 320.

The previous view menu 370 is used to display a previous view. The user may return to the previous view by clicking the previous view menu 370.

Figure 4:
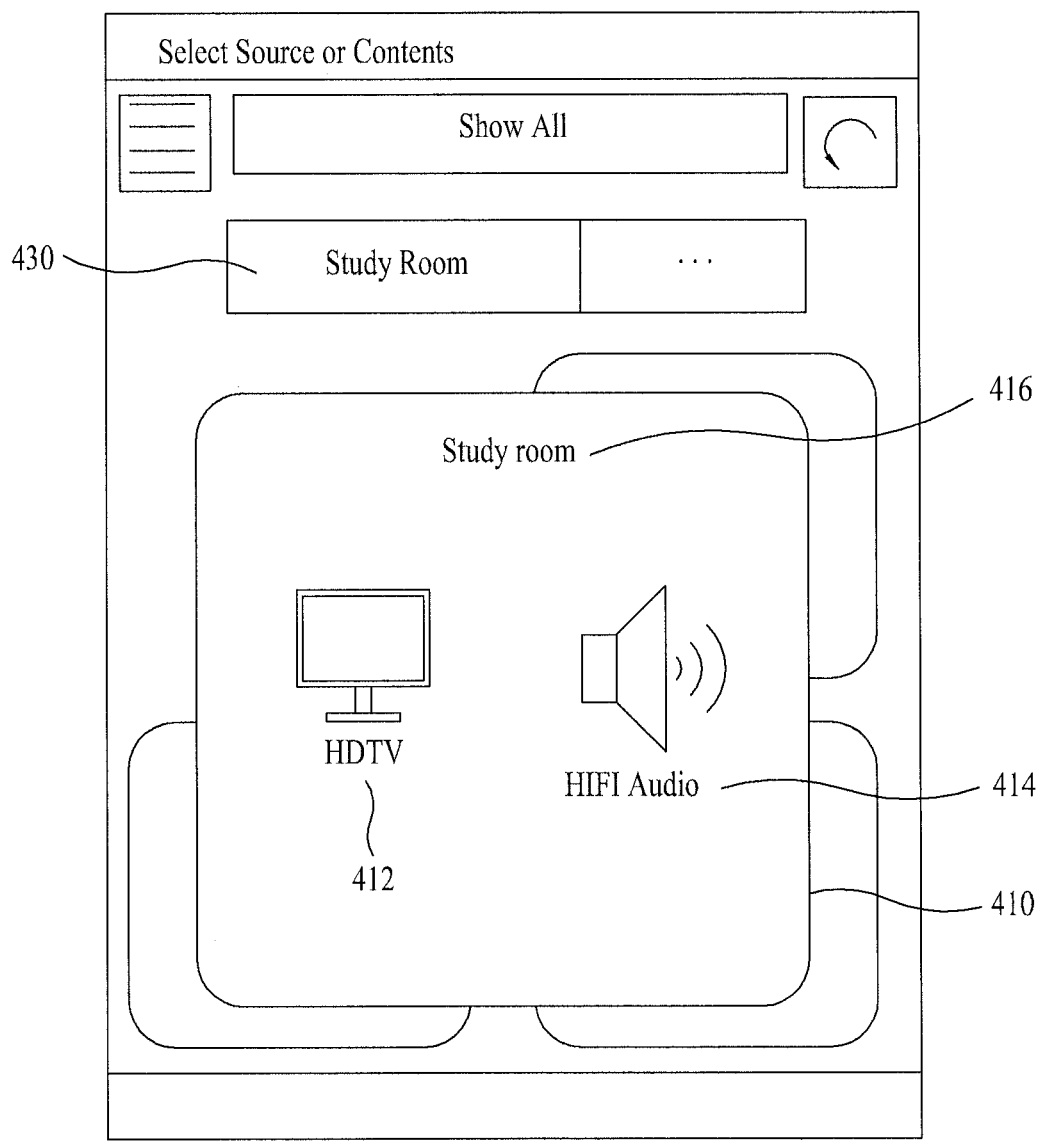
FIG. 4 illustrates a screen that displays a GUI according to another embodiment of the present invention.

FIG. 4 illustrates a screen that displays a GUI according to another embodiment of the present invention.

Referring to FIG. 4, when Alice selects the study room by clicking the place selection menu 320, the controller 210 controls player selection menus 412 and 414 indicating players located in the study room to be displayed. The player selection menu 412 indicates an HDTV and the player selection menu 414 indicates a High Fidelity (HIFI) audio. The player selection menus 412 and 414 may be displayed in a pop-up window 410 which may include an identifier 416 identifying the study room. Also, the controller 210 may control an identifier 430 indicating that the study room has been selected to be displayed on the screen.

The user may select a player by clicking the player selection menu 412 or 414. For example, the user may select the HDTV by clicking the player selection menu 412.

Figure 5:
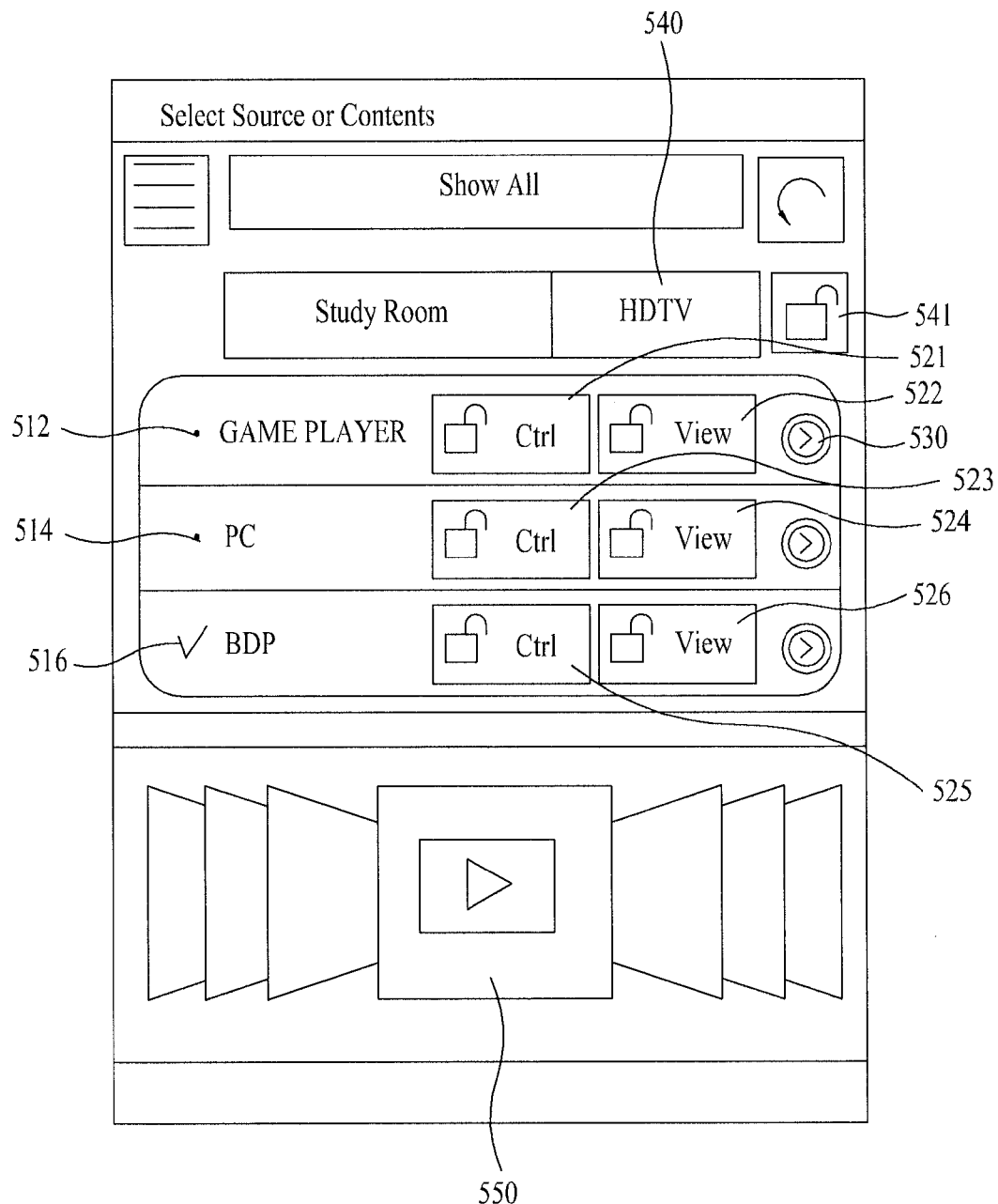
FIG. 5 illustrates a screen that displays a GUI according to another embodiment of the present invention.

FIG. 5 illustrates a screen that displays a GUI according to another embodiment of the present invention.

Referring to FIG. 5, when Alice selects the HDTV by clicking the player selection menu 412, the controller 210 controls source selection menus 512, 514 and 516 indicating sources capable of outputting contents to the HDTV to be displayed. The source selection menu 512 indicates a game player, the source selection menu 514 indicates a PC, and the source selection menu 516 indicates a BDP. The controller 210 may also control an identifier 540 indicating that the HDTV has been selected to be displayed.

The user may select a source indicated by the source selection menu 512, 514 or 516 by clicking the source selection menu 512, 514 or 516. For example, the user may select the BDP by clicking the source selection menu 516. Herein, the controller 210 may control a check mark 516 to be displayed on the screen in order to notify that the BDP has been selected.

When Alice selects the BDP by clicking the source selection menu 516, the controller 210 displays a list of contents available from the selected BDP. The controller 210 may receive the content list from the BDP by the DLNA protocol.

Alice may select a particular content 550 from the displayed content list. Specifically, Alice may move the intended content to the area 550 by moving the content list using a directional key of the remote controller 201 and select the content in the area 550 by a selection key of the remote controller 201.

When Alice selects the content 550, the controller 210 controls the selected content to be displayed at the player. The selected content may be transmitted uncompressed from the source to the player through the HDBaseTSwitch 110 without delay.

The controller 210 may control locking menus 521 to 526 and 541 to be further displayed on the screen. The locking menus 521 to 526 are used to lock the sources, and the locking menu 541 is used to lock the player.

The locking menus 521, 523 and 525 are used to set a control locking function for the sources, to thereby prevent another user from controlling the sources. The locking menus 522, 524 and 526 are used to set a view locking function for the sources, to thereby prevent another user from viewing contents of the sources.

When the user clicks a menu 530, the controller 210 may control a locking menu for setting a sound locking function to be displayed in order to prevent the sound of a source from being output.

Figure 6:
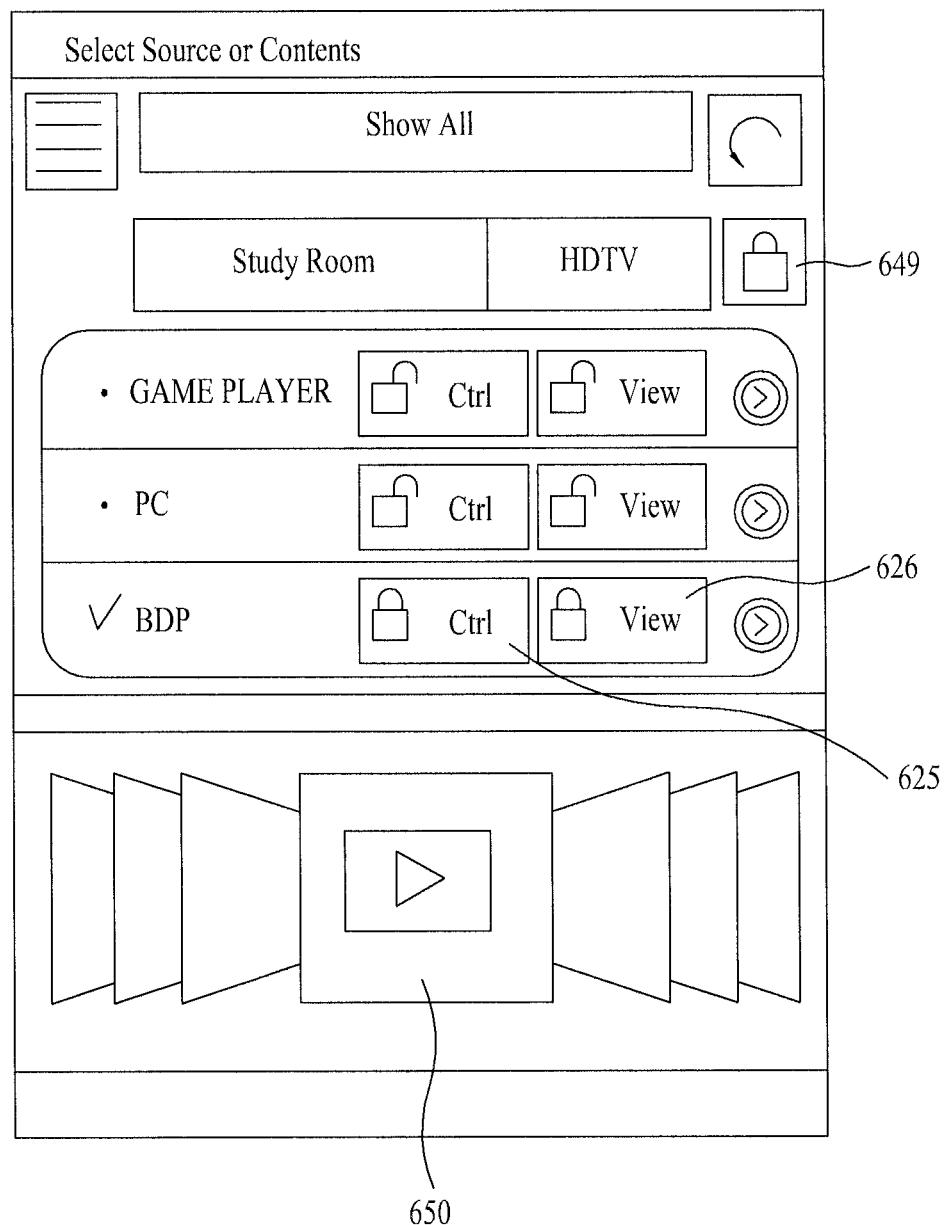
FIG. 6 illustrates a screen that displays a GUI according to another embodiment of the present invention.

FIG. 6 illustrates a screen that displays a GUI according to another embodiment of the present invention.

Referring to FIG. 6, when Alice clicks the locking menu 541, the controller 210 locks the HDTV. To notify that the HDTV has been locked, the controller 210 replaces an open lock 541 with a closed lock 649 on the screen. Then the controller 210 controls the source selection menu indicating the locked HDTV to be displayed as unavailable for selection.

When Alice clicks the locking menu 525, the controller 210 disables the BDP from being controlled. To notify that the BDP has been disabled from being controlled, the controller 210 replaces an open lock 525 with a closed lock 625. Then the controller 210 controls the locking menu associated with the BDP disabled from being controlled to be displayed as unavailable for selection.

When Alice clicks the locking menu 526, the controller 210 disables the BDP from being viewed. To notify that the BDP has been disabled from being viewed, the controller 210 replaces an open lock 526 with a closed lock 626. The controller 210 displays the locking menu associated with the BDP disabled from being viewed to be displayed as unavailable for selection.

Embodiment 2

Figure 7:
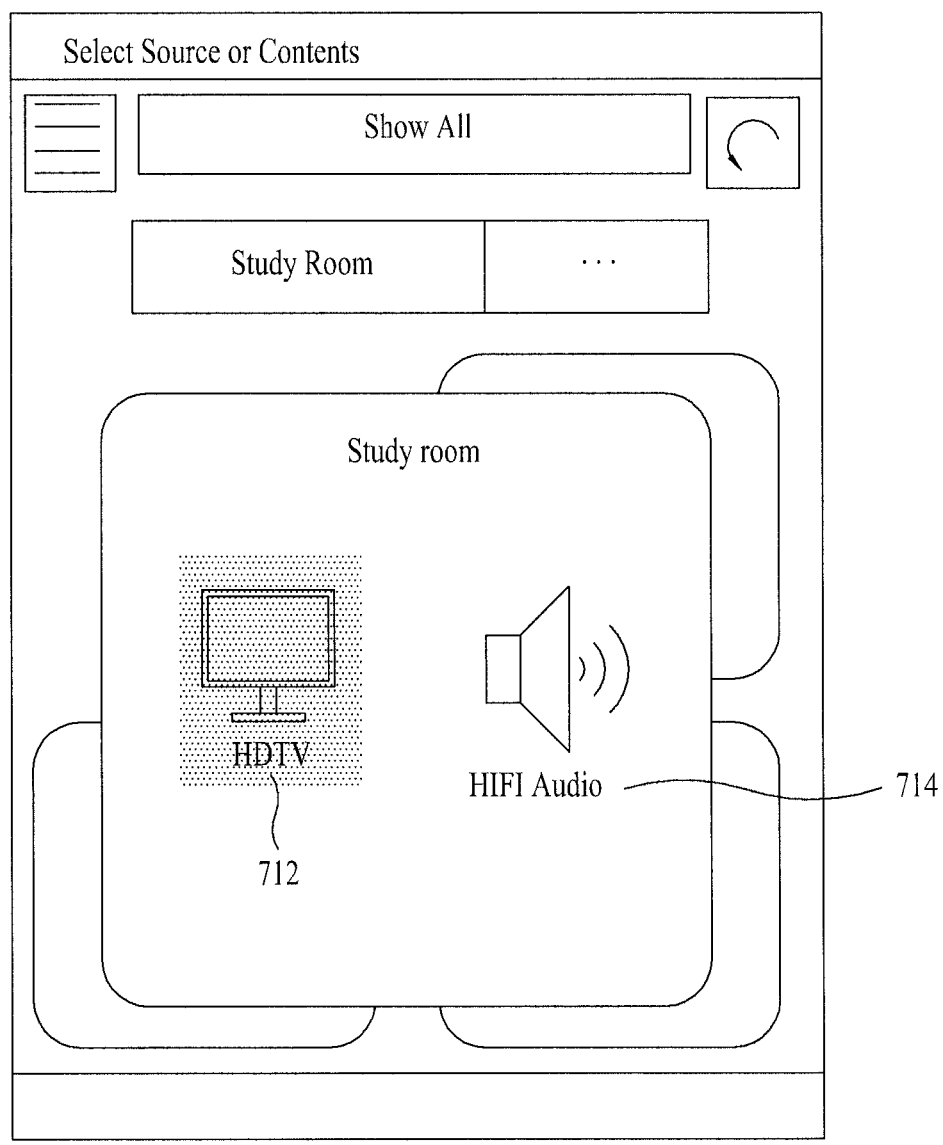
FIG. 7 illustrates a screen that displays a GUI according to another embodiment of the present invention.

FIG. 7 illustrates a screen that displays a GUI according to another embodiment of the present invention.

Referring to FIG. 7, when Bob selects the study room by clicking the place selection menu 320, the controller 210 controls player selection menus 712 and 714 indicating the players located in the study room to be displayed on the screen.

Since Alice has locked the HDTV, the controller 210 controls the player selection menu 712 to be displayed as unavailable for selection. Accordingly, Bob is not allowed to select the HDTV. Instead, Bob may select the HIFI audio by clicking the player selection menu 714 indicating the HIFI audio.

Figure 8:
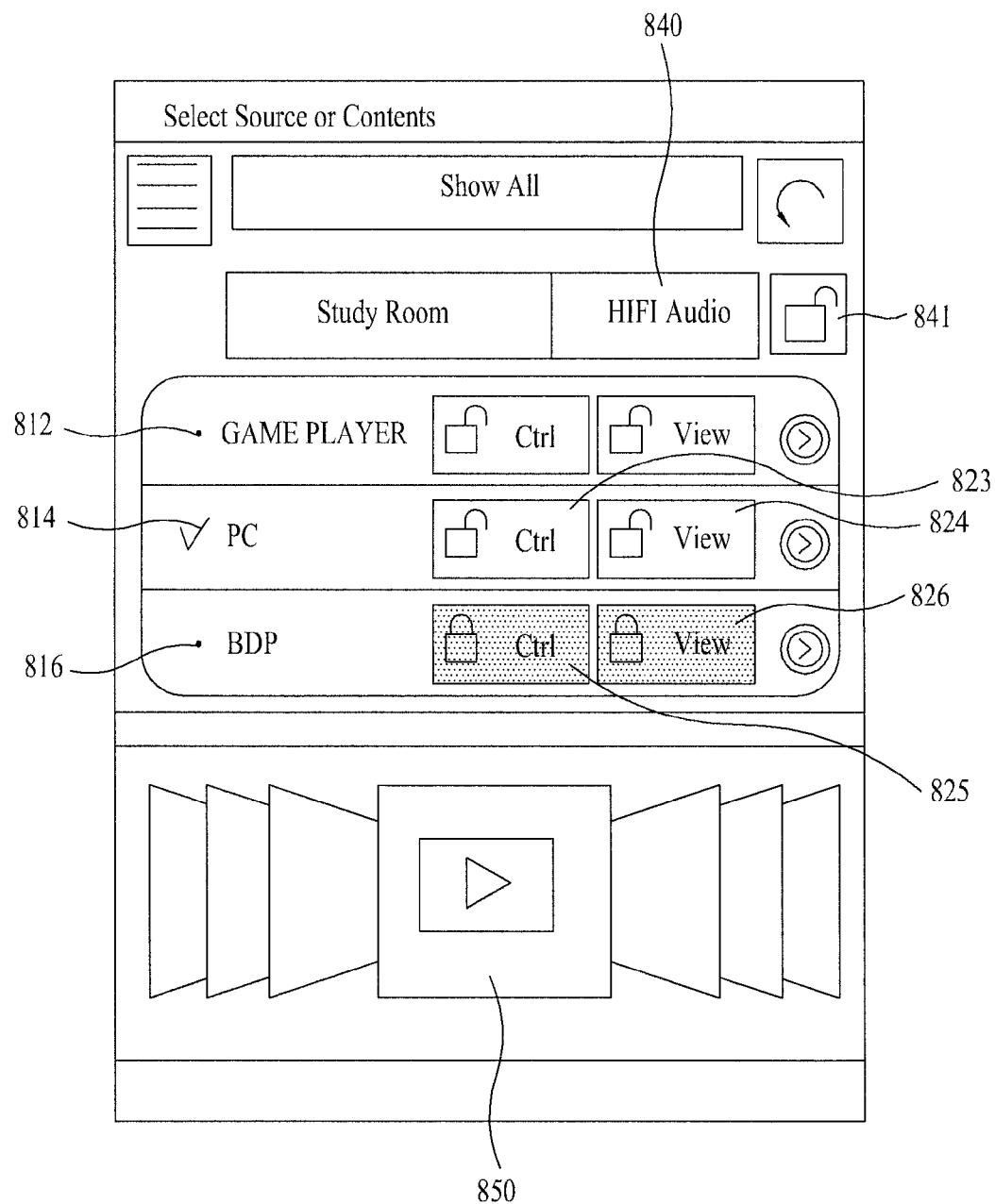
FIG. 8 illustrates a screen that displays a GUI according to another embodiment of the present invention.

FIG. 8 illustrates a screen that displays a GUI according to another embodiment of the present invention.

Referring to FIG. 8, when Bob selects the HIFI audio by clicking the player selection menu 714, the controller 210 controls source selection menus 812, 814 and 816 indicating the sources capable of outputting contents to the HIFI audio to be displayed on the screen. Also, the controller 210 controls an identifier 840 indicating that the HIFI audio has been selected to be displayed.

Since Alice has disabled the BDP from being controlled and viewed, the controller 210 controls a locking menu 825 for setting the control locking function for the BDP and a locking menu 826 for setting the view locking function for the BDP to be displayed as unavailable for selection.

When Bob selects the PC by clicking the source selection menu 516, the controller 210 displays a list of contents available from the PC. The controller 210 may receive the content list from the PC by the DLNA protocol. Herein, the controller 210 may control a check mark 814 indicating that the PC has been selected to be displayed on the screen.

Bob may select a particular content 850 from the displayed content list. Specifically, Bob may move the intended content to the area 850 by moving the content list using a directional key of the remote controller 201 and select the content in the area 850 by a selection key of the remote controller 201.

When Bob selects the content 850, the controller 210 controls the selected content to be displayed at the player. The selected content may be transmitted uncompressed from the source to the player through the HDBaseTSwitch 110 without delay.

Figure 9:
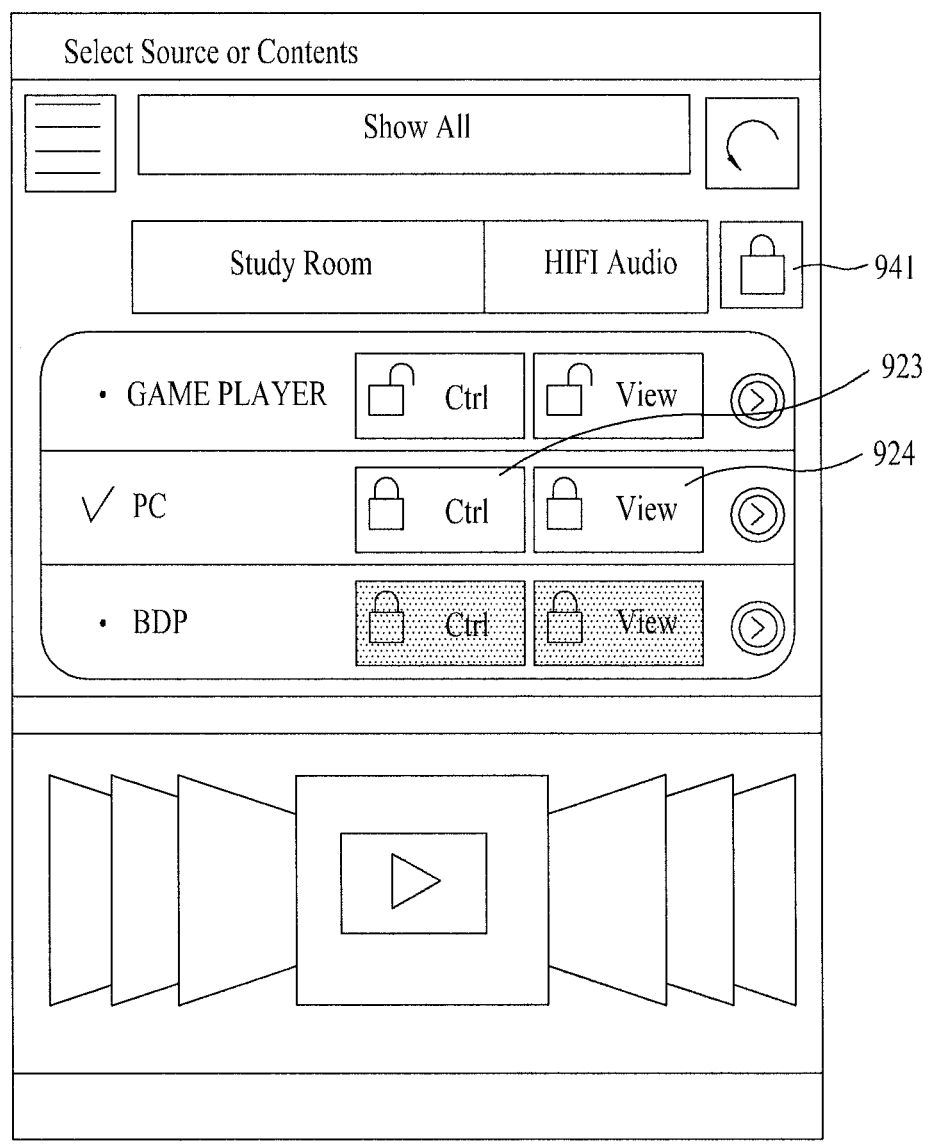
FIG. 9 illustrates a screen that displays a GUI according to a further embodiment of the present invention.

FIG. 9 illustrates a screen that displays a GUI according to another embodiment of the present invention.

Referring to FIG. 9, when Bob clicks the locking menu 841, the controller 210 locks the PC. To notify that the PC has been locked, the controller 210 replaces an open lock 841 with a closed lock 941.

When Bob clicks the locking menu 823, the controller 210 disables the PC from being controlled. To notify that the PC has been disabled from being controlled, the controller 210 replaces an open lock 823 with a closed lock 923.

When Bob clicks the locking menu 824, the controller 210 disables the PC from being viewed. To notify that the PC has been disabled from being viewed, the controller 210 replaces an open lock 824 with a closed lock 924.

FIG. 10 is a flowchart illustrating a method for providing a GUI according to an embodiment of the present invention.

Referring to FIG. 10, the display 220 displays at least one place selection menu indicating a place in which a multimedia device is located in step S100. The place selection menus 320 to 350 illustrated in FIG. 3 may be displayed.

The controller 210 determines whether any of the displayed place selection menus has been selected in step S105. To select a place selection menu, the user may move an indicator displayed on the screen to the place selection menu by use of a direction key of the remote controller 201 and then pressing a selection key of the remote controller 201.

Upon selection of a place selection menu, the controller 210 displays at least one player selection menu indicating a player located in the place indicated by the selected place selection menu in step S110. The player selection menus 412 and 414 illustrated in FIG. 4 may be displayed. In addition, the controller 210 may display a player selection menu indicating a locked player as unavailable for selection.

The controller 210 determines whether one of the displayed player selection menus has been selected in step S115. To select a player selection menu, the user may move a displayed indicator to the player selection menu using a directional key of the remote controller 201 and press a selection key of the remote controller 201.

Upon selection of a player selection menu, the controller 210 displays at least one source selection menu indicating a source capable of outputting contents to the player indicated by the selected player selection menu and a locking menu for locking at least one of the player and the source in step S120. The source selection menus 512, 514 and 516 and the locking menus 521 to 526 and 541 illustrated in FIG. 5 may be displayed. In addition, the controller 210 may display a locking menu associated with a locked source as unavailable for selection.

In step S125, the controller 210 determines whether a locking function has been requested. When the user has requested the locking function, the controller 210 sets the locking function for a corresponding multimedia device in step S130. The locking function may include a control locking function for disabling the multimedia device from being controlled, a view locking function for disabling contents of the multimedia device from being viewed, and a sound locking function for disabling the multimedia device from outputting sound.

The controller 210 determines whether one of the displayed source selection menus has been selected in step S135. To select a source selection menu, the user may move a displayed indicator to the source selection menu by a direction key of the remote controller 201 and press the selection key of the remote controller 201.

Upon selection of a source selection menu, the controller 210 controls connection between the source and the player in step S140. The controller 210 may control the connection between the source and the player so that contents of the source indicated by the selected source selection menu are output to the player indicated by the selected player selection menu. Also, the controller 210 may control the connection between the source and the player so that displaying the contents output from the source at the player is controlled.

The controller 210 displays a list of contents available from the source indicated by the selected source selection menu in step S145. The controller 210 may receive the content list from the source by the DLNA protocol. The content list may take the form of the content list 550 illustrated in FIG. 5.

The controller 210 determines whether a content has been selected from the content list in step S150. For selection of a content, the user may use the remote controller 201.

Upon selection of a particular content, the controller 210 controls the selected content to be displayed in the player in step S155. The content may be transmitted uncompressed from the source to the player without delay through the HDBaseTSwitch 110.

Various embodiments have been described in the best mode for carrying out the invention.

The present invention may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner.

It will be apparent to those skilled in the art that various modifications and variations can be made in the present invention without departing from the spirit or scope of the invention. Thus it is intended that the present invention covers the modifications and variations of the invention provided they come within the scope of the appended claims and their equivalents.

The invention claimed is:

1. A method for displaying a graphic user interface at a control apparatus connected to a local network, the method comprising:
   displaying a place selection menu for selecting a place in which at least one multimedia device is located;
   displaying, upon selection of the place from the place selection menu, a player selection menu including a player list of at least one player located in the selected place;
   displaying, upon selection of the player from the player list of the player selection menu, a source selection menu including a source list of at least one a source capable of outputting contents to the selected player while displaying at least one locking menu for setting a locking function corresponding to each of the selected player from the player selection menu and the at least one source from the source list;
   displaying a list of contents available from a source selected from the source list of the source selection menu; and
   controlling connection between the selected source and the selected player, upon selection of the list of contents,
   wherein the locking function includes a control locking function for disabling at least one of the player and the source from being controlled,
   wherein when the control locking function of a player from among the at least one player in the player list is already locked by another control apparatus when the player selection menu is displayed, the player whose control locking function is locked is displayed as being unavailable for selection in the player list, and
   wherein when the control locking function of a source from among the at least one source in the source list is already locked by another control apparatus when the source selection menu is displayed, the source whose control locking function is locked is displayed as being unavailable for unlock of the control locking function in the locking menu.

2. The method according to claim 1, wherein the locking function further includes a view locking function for disabling each of the at least one source in the source list, and
   wherein when the view locking function of at least one source is already locked by another control apparatus when the source selection menu is displayed, the list of contents of the source whose view locking function is locked is displayed as being unavailable for selection.

3. The method according to claim 1, wherein the list of contents is received by a specific network protocol.

4. The method according to claim 1, wherein the selected source and the selected player are controlled by a specific signal for controlling electronics.

5. An apparatus for controlling at least one multimedia device connected to a local network, the apparatus comprising:
   a network interface configured to transmit data to the at least one multimedia device and to receive data from the at least one multimedia device;
   a display unit configured to display information; and
   a controller configured to:
      control the display unit to display a place selection menu for selecting a place in which at least one multimedia device is located,
      control the display unit to display, upon selection of the place from the place selection menu, a player selection menu including a player list of at least one player located in the selected place,
      control the display unit to display, upon selection of a player from the player list of the player selection menu, a source selection menu including a source list of at least one source capable of outputting contents to the selected player from the player selection menu and simultaneously displaying, on the screen, at least one locking menu for setting a locking function corresponding to each of the selected player from the player selection menu and the at least one source in the source list,
      control the display unit to display, upon selection of a source selected from the source list of the source selection menu, a list of contents available from the selected source from the source selection menu, and
      control a connection between the selected source and the selected player, upon selection of the list of contents,
   wherein the locking function includes:
      a control locking function for disabling at least one of the player and the source from being controlled,
   wherein when the control locking function of a player from among the at least one player in the player list is already locked by another control apparatus when the player selection menu is displayed, the player whose control locking function is locked is displayed as being unavailable for selection in the player list, and
   wherein when the control locking function of a source from among the at least one source in the source list is already locked by another control apparatus when the source selection menu is displayed, the source whose control locking function is locked is displayed as being unavailable for unlock of the control locking function in the locking menu.

6. The apparatus according to claim 5, wherein the locking function further includes a view locking function for disabling each of the at least one source in the source list, and
   wherein when the view locking function of at least one source is already locked by another control apparatus when the source selection menu is displayed, the list of contents of the source whose view locking function is locked is displayed as being unavailable for selection.

7. The apparatus according to claim 5, wherein the controller controls the list of contents to be received by a specific network protocol.

8. The apparatus according to claim 5, wherein the controller controls the selected source and the selected player by a specific signal for controlling electronics.

* * * * *